(12) United States Patent
Mizuno (10) Patent No.: US 10,337,634 B2
(45) Date of Patent: Jul. 2, 2019

(54) CURRENT CONTROL CIRCUIT

(71) Applicant: DENSO CORPORATION, Kariya, Aichi-pref. (JP)

(72) Inventor: Yuta Mizuno, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/837,094

(22) Filed: Dec. 11, 2017

(65) Prior Publication Data

US 2018/0328514 A1  Nov. 15, 2018

(30) Foreign Application Priority Data

May 12, 2017  (JP) .................................. 2017-95931

(51) Int. Cl.
| | |
|---|---|
| F16H 61/00 | (2006.01) |
| F16K 31/00 | (2006.01) |
| H01F 7/06 | (2006.01) |
| F16K 3/24 | (2006.01) |
| F16H 61/02 | (2006.01) |
| F16K 31/06 | (2006.01) |

(52) U.S. Cl.
CPC ....... F16K 31/002 (2013.01); F16H 61/0251 (2013.01); F16K 3/24 (2013.01); F16K 31/0675 (2013.01); H01F 7/064 (2013.01); F16H 61/0021 (2013.01); F16H 2061/0255 (2013.01)

(58) Field of Classification Search
CPC .............. F16H 61/0021; F16H 61/0251; F16H 2061/0255; F16K 31/002
See application file for complete search history.

(56) References Cited

U.S. PATENT DOCUMENTS

| | | | | |
|---|---|---|---|---|
| 5,222,417 A | * | 6/1993 | Sato | ..................... F16H 61/0021 137/330 |
| 2009/0005913 A1 | * | 1/2009 | Fernandez | ......... G05D 16/2013 700/282 |
| 2009/0206292 A1 | * | 8/2009 | Popp | .................... F16H 61/0251 251/129.15 |
| 2010/0101653 A1 | * | 4/2010 | Ogata | ..................... F16H 61/12 137/2 |
| 2014/0254058 A1 | | 9/2014 | Suzuki et al. | |

* cited by examiner

Primary Examiner — Edwin A Young
(74) Attorney, Agent, or Firm — Posz Law Group, PLC (57) ABSTRACT

A current control circuit controls a linear solenoid valve provided in an oil pressure circuit to feed back an output oil pressure. The current control circuit includes a PWM signal generation part, a target setting part, a duty ratio setting part and a vibration detection circuit. The target setting part sets a target current value, which is a target value of an excitation current of the linear solenoid valve and periodically varies with a predetermined dither amplitude and a dither period longer than a pulse period of the PWM signal. The self-excited vibration detection part calculates a phase difference between the target current value and an actual current value and detects a presence of self-excited vibration because of a resonance of a feedback of the output oil pressure and driving of the linear solenoid valve in the dither period when the phase difference decreases relative to an increase in the target current value or the phase difference increases relative to a decrease in the dither period.

20 Claims, 11 Drawing Sheets

CURRENT CONTROL CIRCUIT

CROSS REFERENCE TO RELATED APPLICATION

The present application is based on Japanese patent application No. 2017-95931 filed on May 12, 2017, the whole contents of which are incorporated herein by reference.

FIELD

The present disclosure relates to a current control circuit.

BACKGROUND

Electromagnetic valve are used in many systems, for example, in a hydraulic oil pressure circuit for controlling oil pressure in an automatic transmission of a vehicle. A current control circuit for the electromagnetic valve, for example, a linear solenoid valve, is disclosed in JP 2014-197655A (US 2014/0254058 A1).

This current control circuit is configured to control an excitation current of the electromagnetic valve by a pulse width modulation signal (PWM signal). The current control circuit periodically varies the excitation current with a predetermined dither amplitude and a dither period longer than a PWM period, which is a pulse period of the PWM signal. The current control circuit thus causes a spool to slightly vibrate in the electromagnetic valve thereby suppressing degradation and variation of responsiveness, which are caused by static friction.

For improving responsiveness, it is proposed to provide the electromagnetic valve in the oil pressure circuit and feed back an output oil pressure of the electromagnetic valve to the spool. According to the proposed control, the spool is biased in a direction of movement by the feedback oil pressure to correct communication between an input port and an output port of the electromagnetic valve.

However, the feedback time for the spool varies with the output oil pressure, length of hydraulic flow circuit, viscosity of oil (temperature of oil) and the like. For this reason, the electromagnetic valve occasionally resonates when the time of feedback of the oil pressure to the spool and the time of small vibration of the spool match. This resonance is a self-excited vibration. The self-excited vibration abrades the spool rapidly.

Even in case that the dither period and the dither amplitude are designed not to cause the self-excited vibration, the self-excited vibration is still likely to arise because of unexpected environmental changes such as oil temperature change, which arise in the course of control operation.

SUMMARY

It is therefore an object to provide a current control circuit, which detects a self-excited vibration with a simple configuration.

A current control circuit for an electromagnetic valve, which is provided in an oil pressure circuit to feed back an output oil pressure, comprises a PWM signal generation part, a target setting part, a duty ratio setting part and a vibration detection part. The PWM signal generation part is configured to generate a PWM signal outputted to a driving circuit of the electromagnetic valve. The target setting part is configured to set a target current value, which is a target value of an excitation current of the electromagnetic valve and periodically varies with a predetermined dither amplitude and a dither period longer than a pulse period of the PWM signal. The duty ratio setting part is configured to set a duty ratio of the PWM signal so that an actual current of the excitation current of the electromagnetic valve follows the target current value. The vibration detection part is configured to calculate a phase difference between the target current value and the actual current value and detecting a presence of self-excited vibration in the electromagnetic valve because of a resonance of a feedback of the output oil pressure and driving of the electromagnetic valve in the dither period when the phase difference decreases relative to an increase in the target current value or the phase difference increases relative to a decrease in the dither period.

DETAILED DESCRIPTION OF THE EMBODIMENTS

A current control circuit will be described below with reference to embodiments, in which same functional and/or structurally similar parts are designated with same reference numerals.

First Embodiment

Figure 1:
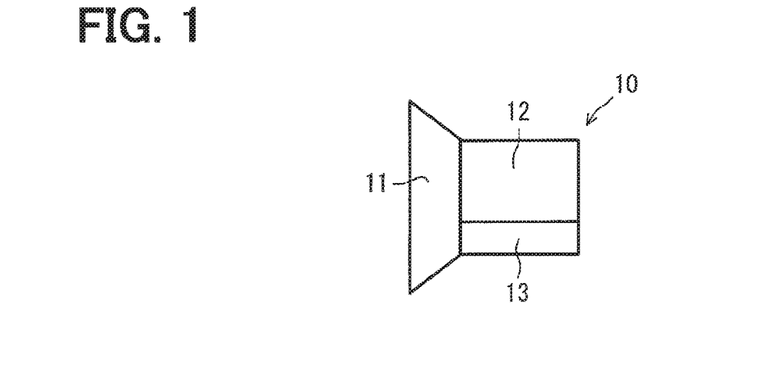
FIG. 1 is a schematic view showing a whole configuration of an automatic transmission of a vehicle.

Referring first to FIG. 1, a current control circuit according to a first embodiment is implemented as an electronic control unit (ECU), which controls a gear ratio of an automatic transmission 10 of a vehicle. The automatic transmission 10 is formed of a torque converter 11, a gear train 12 and a valve body 13. The gear train 12 is a speed changing mechanism and the valve body 13 is an oil pressure device. The valve body 13 is provided with a hydraulic oil pressure circuit, which regulates a pressure of the operation oil supplied to the gear train 12.

Figure 2:
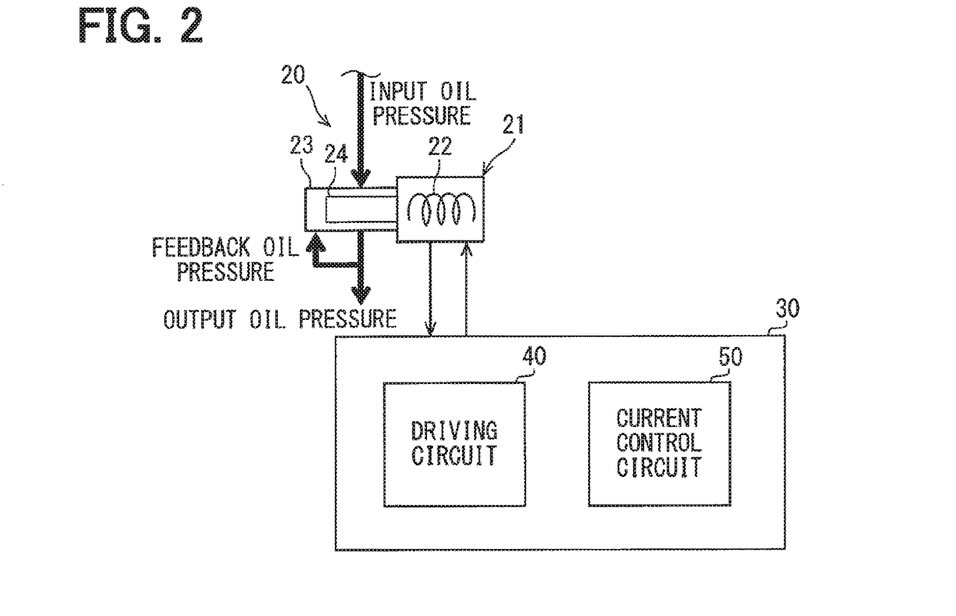
FIG. 2 is a schematic diagram showing an oil pressure circuit and an electronic control unit, which includes a current control circuit according to a first embodiment.

As shown in FIG. 2, the oil pressure circuit 20 is provided with a linear solenoid valve 21. The linear solenoid valve 21 is an electromagnetic valve. The electronic control unit 30 controls the pressure of the operation oil supplied to the gear train 12 by controlling an excitation current of a solenoid (coil) 22, which is provided in the linear solenoid valve 21. The operation oil is a transmission fluid. The electronic control unit 30 includes a driving circuit 40 for the solenoid 22 and a current control circuit 50, which controls the excitation current of the solenoid 22.

The linear solenoid valve 21 includes not only the solenoid 22 but also a sleeve 23 and a spool 24. The sleeve 23 is provided with multiple ports (not shown). The spool 24 is located within the sleeve 23 movably in an axial direction to regulate on-off states among the ports. The spool 24 is configured to be movable integrally with a movable part (for example, movable core) of the solenoid 22.

By regulating the communication between an input port and an output port, the linear solenoid valve 21 regulates an oil pressure supplied to the input port to a target pressure value and outputs the regulated oil pressure from the output port. The communication state between the ports is controlled by an amount of current supply (excitation current) to the solenoid 22.

The linear solenoid valve 21 is configured to correct the communication state with high responsiveness by feeding back the output oil pressure, which is outputted from the output port, to the spool 24. The linear solenoid valve 21 is further configured to correct the communication state against external disturbances such as variations in the input oil pressure by feeding back the output oil pressure. The output oil pressure is fed back through a feedback port (not shown).

Figure 3:
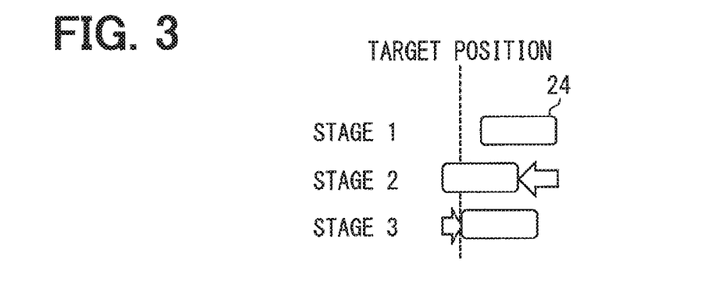
FIG. 3 is a schematic illustration showing a movement of a spool at time of changing an oil pressure.

Referring to FIG. 3, a mechanism for correcting the communication state with high responsiveness will be described.

In FIG. 3, stage 1 indicates an initial state before the spool 24 is moved. When the oil pressure is changed over, the spool 24 is controlled to move from the position (stroke) of the initial state to a position overshooting a target position at stage 2. In the course of overshooting of the spool 24, the input port and the output port are communicated. When the operation oil is outputted from the output port, the output oil pressure is fed back to the spool 24 through the feedback port (step 2). With the feedback of the operation oil pressure, movement (stroke) of the spool 24 is suppressed so that the spool 24 is positioned at the target position (stage 3). Thus the communication state is corrected. As a result, the linear solenoid valve 21 has high responsiveness relative to the oil pressure changeover.

Figure 4:
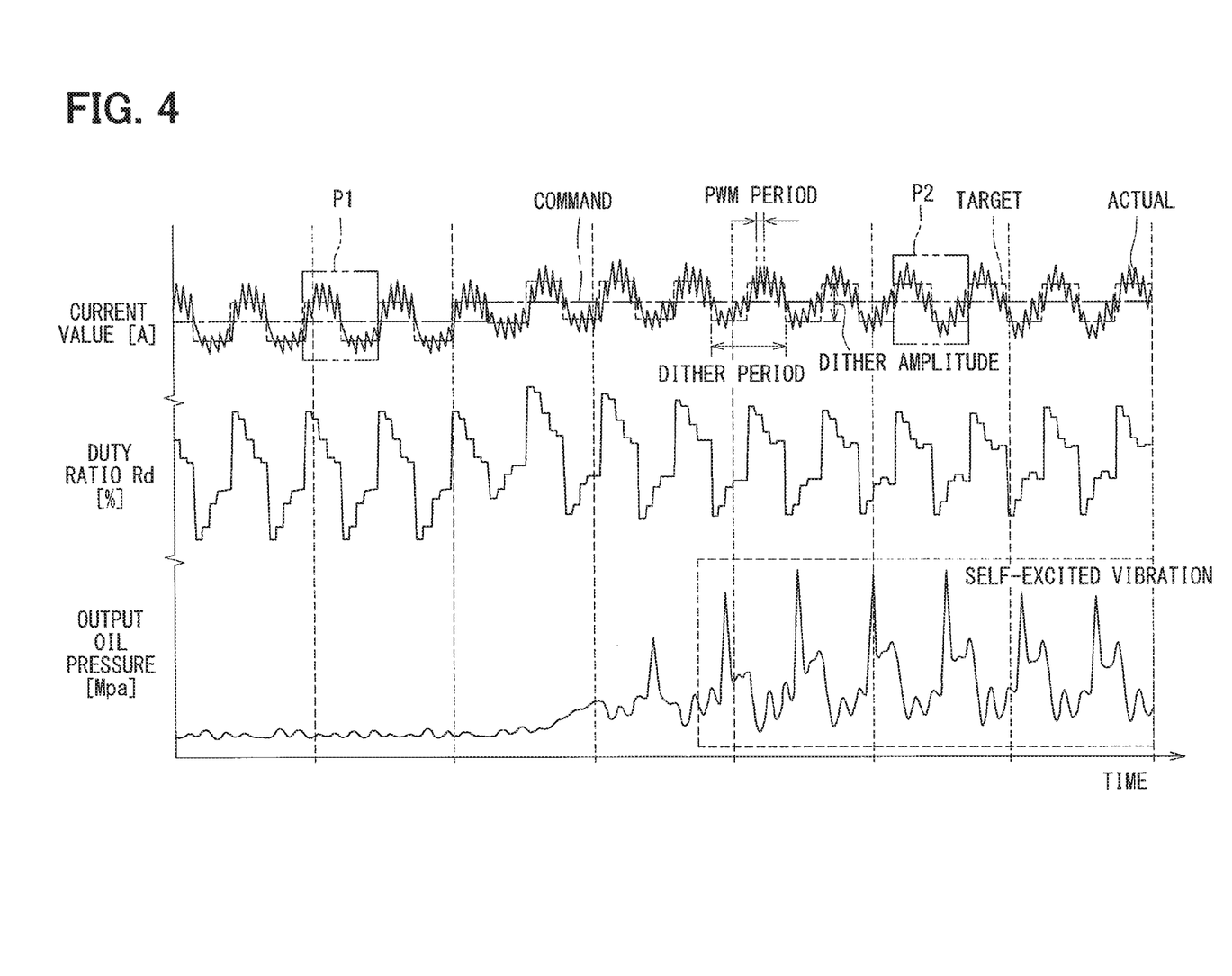
FIG. 4 is a time chart showing a self-excited vibration.
Figure 5:
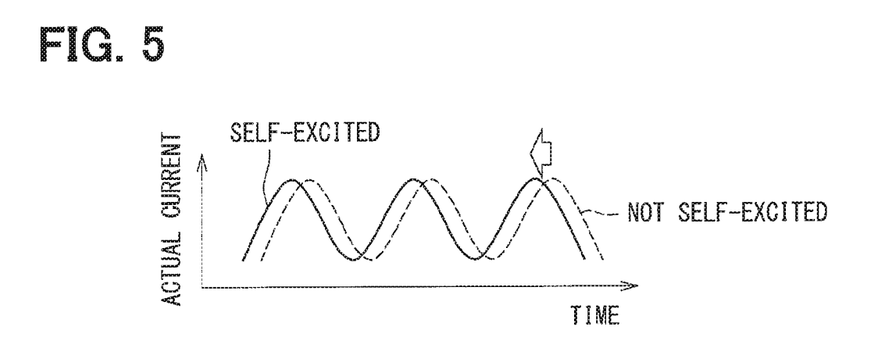
FIG. 5 is a time chart showing a self-excited vibration.
Figure 6:
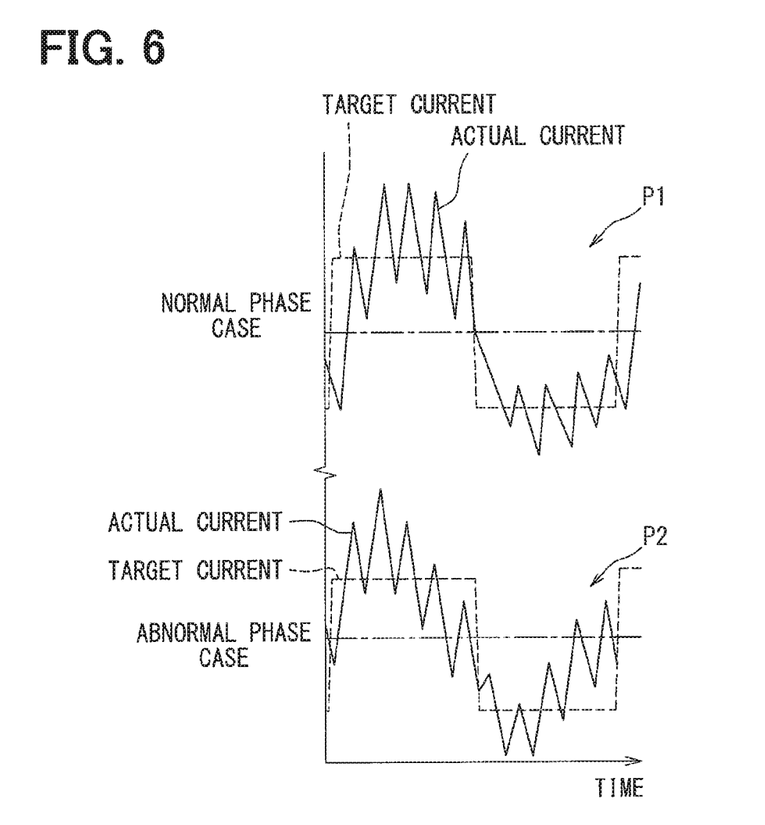
FIG. 6 is a time chart showing comparison of periods P1 and P2.

However, the feedback mechanism described above may cause a self-excited vibration in the solenoid valve 21 adversely. This self-excited vibration will be described with reference to FIG. 4 to FIG. 6. FIG. 4 shows actual changes of the excitation current, the duty ratio Rd and the output oil pressure confirmed by the inventors. In FIG. 4 and FIG. 6, an actual current value in one cycle period of the PWM period is shown as a waveform, which is before averaging. In FIG. 5, the actual current value is shown as a waveform, which is after averaging.

As described later, the current control circuit 50 controls the excitation current of the solenoid 22 by the PWM signal (pulse width modulation signal) of the duty ratio Rd. As shown in FIG. 4, the current control circuit 50 periodically varies the excitation current with a predetermined dither amplitude and a predetermined dither period longer than a PWM period, which is a one cycle pulse period of the PWM signal. Thus, the current control circuit 50 causes the movable part of the solenoid 22 and hence the spool 24 to vibrate slightly so that degradation of responsiveness and variation in responsiveness, which are caused by static friction, may be suppressed. The time point of the feedback of the output oil pressure varies with a pressure of the operation oil pressure, a viscosity (that is, oil temperature) and the like of the operation oil. For this reason, when the feedback time point of the output oil pressure and the time point of the slight vibration of the spool 24 match in time, a resonance arises and the output oil pressure continues to vary largely as shown at the right half in FIG. 4. This resonance is the self-excited vibration. The self-excited vibration abrades the spool 24, for example, rapidly.

When the self-excited vibration arises, as shown in FIG. 5, a phase of an actual current value, which is a detection value of the excitation current of the solenoid 22, deviates as indicated by a solid line relative to that of a case, in which no self-excited vibration is present as indicated by a dotted line. It is however not practical to predefine the phase of the normal operation time, in which no self-excited vibration is present, to detect the self-excited vibration, because there are too many patterns, which are highly dependent on the environments. For this reason, attention is paid to the deviation of the phase of the actual current value relative to the phase of the target current value.

In FIG. 6, a top-side waveform shows a waveform in a period P1 (indicated in FIG. 4) and a bottom-side waveform shows a waveform in a period P2 (indicated in FIG. 4). In the period P1, no self-excited vibration is assumed to be present. That is, the phase of the actual current value is normal in the period P1. In the period P2, the self-excited vibration is assumed to be present. That is, the phase of the actual current value is abnormal in the period P2. The dither periods are identical between the period P1 and the period P2. It is noted as a result of comparison of the waveforms in the period P1 and the period P2 that the phase of the actual current value in the period P2 deviates.

Figure 7:
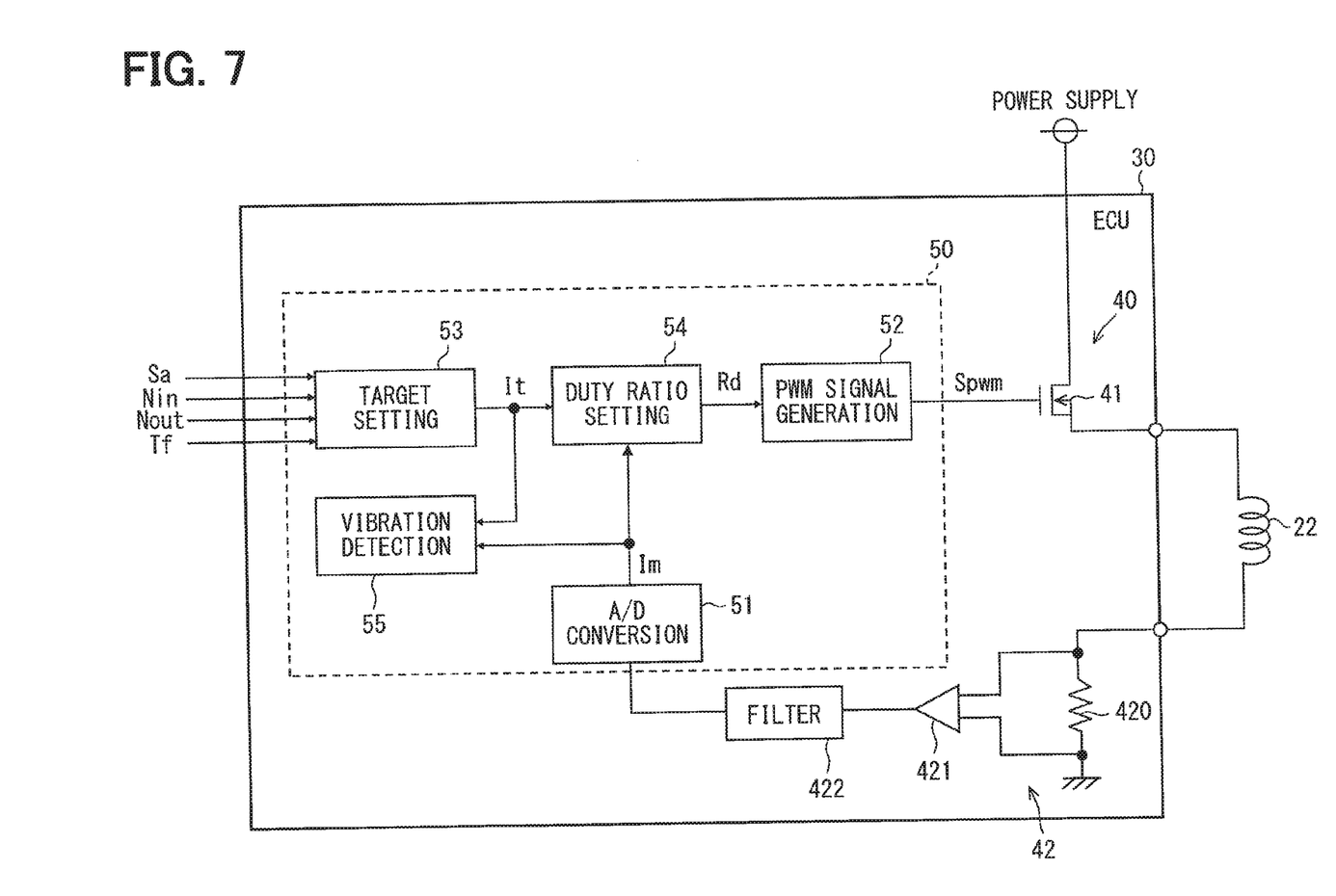
FIG. 7 is a block diagram showing the current control circuit in detail.

A general configuration of the electronic control unit 30 and the current control circuit 50 configured to detect the self-excited vibration will be described next with reference to FIG. 7. As shown in FIG. 7, the electronic control unit 30 includes a driving circuit 40 and the current control circuit 50.

The driving circuit 40 is formed of a switching element 41 and a current detection part 42. The switching element 41 is connected in series with the coil of the solenoid 22. The switching element 41 is provided in the current supply path of the solenoid 22. The switching element 41 is a transistor, which repeats turning on and off in response to a PWM signal Spwm outputted from the current control circuit 50 thereby to connect and disconnect the solenoid 22 to and from a power supply source. The excitation current flowing in the coil of the solenoid 22 periodically changes with the dither period Td and the spool linked to the movable part of the solenoid 22 vibrates slightly in response to the periodic change of the excitation current. In the first embodiment, the switching element 41 is a MOSFET. The switching element 41 is provided at a power source side (high-potential side) relative to the solenoid 22.

The current detection part 42 detects the excitation current, which actually flows in the solenoid 22. The current detection part 42 is formed of a resistor 420, an operational amplifier 421 and a filter 422. The resistor 120 is connected in series with the coil of the solenoid 22. The resistor 420 is provided at a ground side (low-potential side) relative to the solenoid 22. The operational amplifier 421 amplifies a voltage, which is developed between both terminal ends of the resistor 420 and proportional to the excitation current. The filter 422 filters out noise of a voltage amplified by the operational amplifier 421. The filter 422 is formed of a resistor and capacitors, for example.

The current control circuit 50 is formed of a microcomputer, which includes a CPU, a RAM, a ROM and the like, and operates the driving circuit 40 by executing programmed control processing based on detection signals of various sensors. The current control circuit 50 receives through an input circuit (not shown) an accelerator position Sa, an input-side rotation speed Nin and an output-side rotation speed Nout of the automatic transmission 10 and the temperature Tf, which are outputted from the various sensors. The temperature Tf indicates the oil temperature.

The current control circuit 50 includes an A/D conversion part 51, a PWM signal generation part 52, a target setting part 53, a duty ratio setting part 54 and a vibration detection part 55.

The A/D conversion part 51 converts an analog output of the current detection part 42, that is, the filter 422, to a digital value and outputs it as an actual current value Im. In the first embodiment, the A/D conversion part 51 also has a function of calculating an average value of the excitation current of the solenoid 22 in one cycle period of the PWM period. Thus, the averaged value is outputted as the actual current value Im. The PWM signal generation part 52 is configured to generate the PWM signal Spwm based on the duty ratio Rd and outputs it to the driving circuit 40.

The target setting part 53 is configured to set a target current value It, which is a target value of the excitation current of the solenoid 22. The target current value It varies periodically with the predetermined dither amplitude Ad and the predetermined dither period Td longer than the PWM period of the PWM signal Spwm as will be described in detail later.

The duty ratio setting part 54 is configured to set the duty ratio Rd of the PWM signal Spwm based on the target current value It and the actual current value Im. The duty ratio setting part 54 is configured to include therein an error calculation part and a duty ratio calculation part, which are not shown. The error calculation part is configured to calculate an error (current difference) between the target current value It and the actual current value Im.

The duty ratio calculation part is configured to set the duty ratio Rd by, for example, PID control so that the actual current value Im follows the target current value It. Specifically, the duty ratio calculation part calculates a duty ratio proportional to the error, a duty ratio proportional to an integration value of the error and a duty ratio proportional to a differentiation of the error and sets the duty ratio Rd by adding those calculated duty ratios. The duty ratio Rd is not limited to calculation based on the PID control. For example, the duty ratio Rd may be calculated based on PI control.

The self-excited vibration detection part 55 detects the self-excited vibration of the movable part of the solenoid 22 and hence in the spool 24, based on the phase difference between the actual current value Im and the target current value It, as will be described later.

Figure 8:
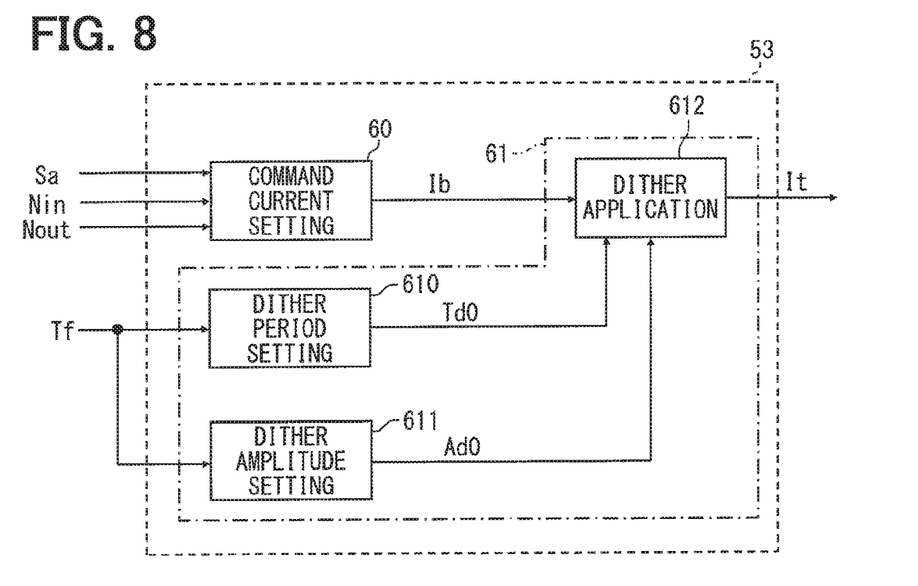
FIG. 8 is a block diagram showing a target setting part in the current control circuit.

The target setting part 53 will be described next with reference to FIG. 8. As shown in FIG. 8, the target setting part 53 includes a command current setting part 60 and a driving pattern setting part 61.

The command setting part 60 is configured to calculate a required oil pressure value, which is a required value of the output oil pressure of the linear solenoid valve 21 based on the operation condition of the vehicle detected by various sensors, and sets a command current value Ib, which corresponds to the required oil pressure value. The required oil pressure value of the output oil pressure corresponds to a desired operation condition of the solenoid 22. The command setting part 60 sets the command current value Ib, which is a base of the target current value It, based on the accelerator position Sa, the input-side rotation speed Nin and the output-side rotation speed Nout. The command current value Ib is exemplarily indicated with a one-dot chain line in FIG. 4.

The driving pattern setting part 61 is configured to set the dither period Td and the dither amplitude Ad, which determine the driving pattern for slightly vibrating the spool 24. In the first embodiment, the driving pattern setting part 61 includes a dither period setting part 610, a dither amplitude setting part 611 and a dither application part 612.

The dither period setting part 610 is configured to set a dither period Td0 based on the temperature Tf. The dither amplitude setting part 611 is configured to set the dither amplitude Ad0 based on the temperature Tf. The dither period setting part 610 and the dither amplitude setting part 611 set base values of the dither period Td and the dither amplitude Ad based on the temperature Tf.

The dither application part 612 is configured to set the dither period Td and the dither amplitude Ad, which are to be applied to the command current value Ib. The dither application part 612 thus sets the target current value It by applying the dither period Td and the dither amplitude Ad to the command current value Id. That is, the dither application part 612 sets a dither current, which periodically varies the dither period Td and the dither amplitude Ad, and calculates the target current value It by adding the dither current value to the command current value Ib. Thus, the dither application part 612 further has a function of generating the target current value It. In the first embodiment, the dither period Td0 and the dither amplitude Ad0 corresponding to the temperature Tf are set as the dither period Td and the dither amplitude Ad, respectively, as the driving pattern.

Processing executed by the self-excited vibration detection part 55 will be described next with reference to FIG. 9 to FIG. 11. With power supply to the electronic control unit 30 and hence to the current control circuit 50, the self-excited vibration detection part 55 repetitively executes the processing described below at every predetermined time interval. In FIG. 10, the target current value It is indicated in a sine wave form. However, the target current value It may be a rectangular wave form as shown in FIG. 1.

Figure 9:
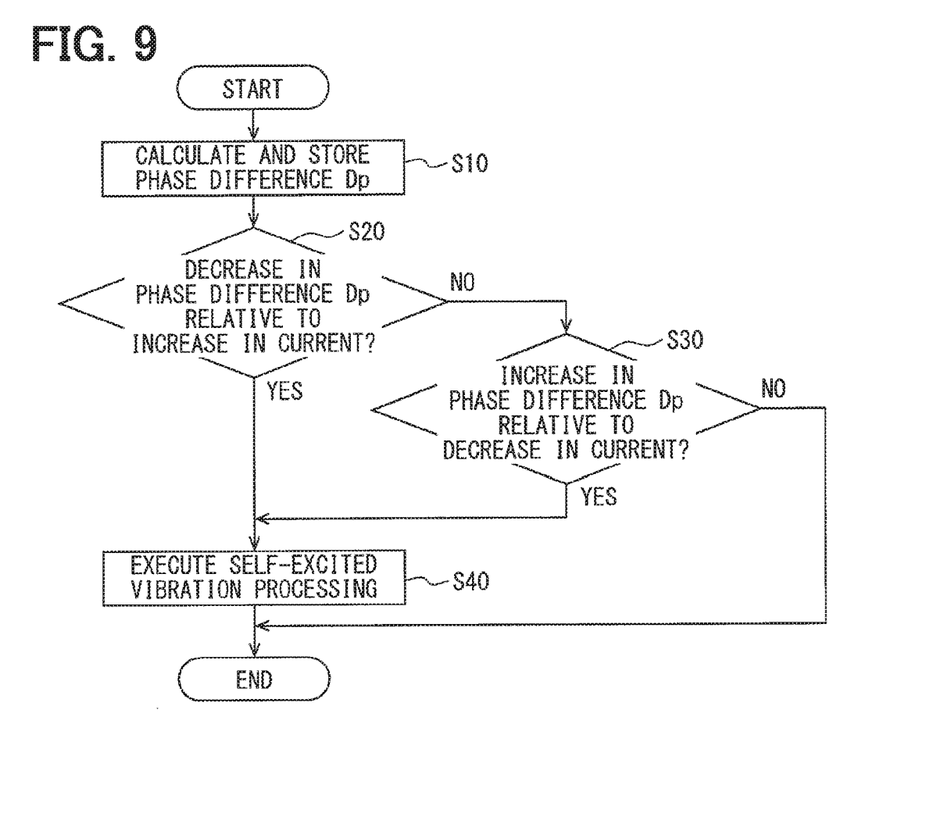
FIG. 9 is a flowchart showing processing executed by a vibration detection part.
Figure 10:
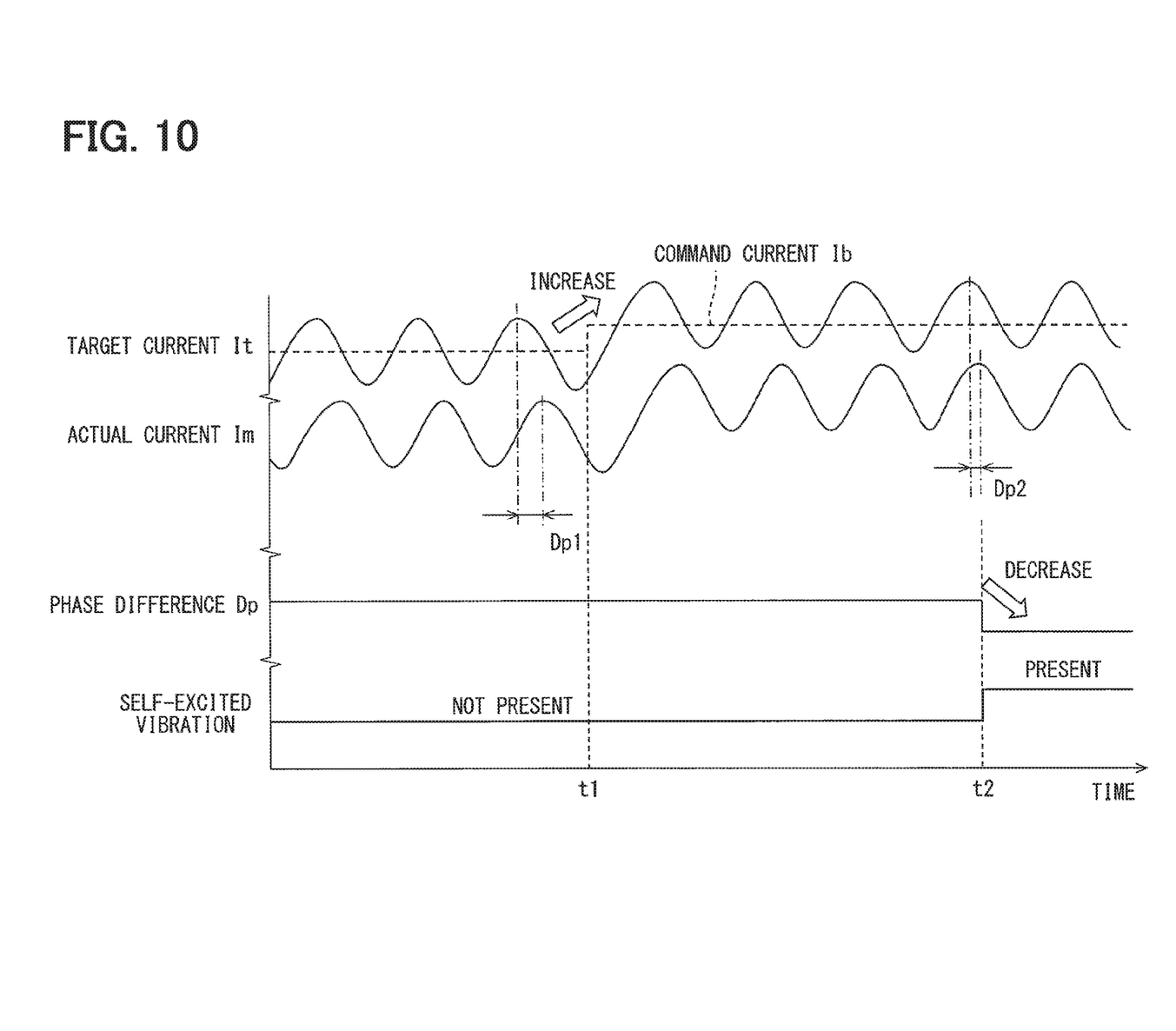
FIG. 10 is a time chart showing one example of detection of the self-excited vibration.

As shown in FIG. 9, the self-excited vibration detection part 55 calculates a current phase difference Dp between the target current value It applied from the target setting part 53 and the actual current value Im applied from the A/D conversion part 51 and stores the calculated phase difference at step S10.

In the first embodiment, as shown in FIG. 10, the phase difference Dp is calculated from a time difference between time points of peak values (maximum values) of the target current value It and the actual current value Im within one period of the dither period Td. The self-excited vibration detection part 55 thus calculates the phase difference Dp once in each dither period Td.

Figure 11:
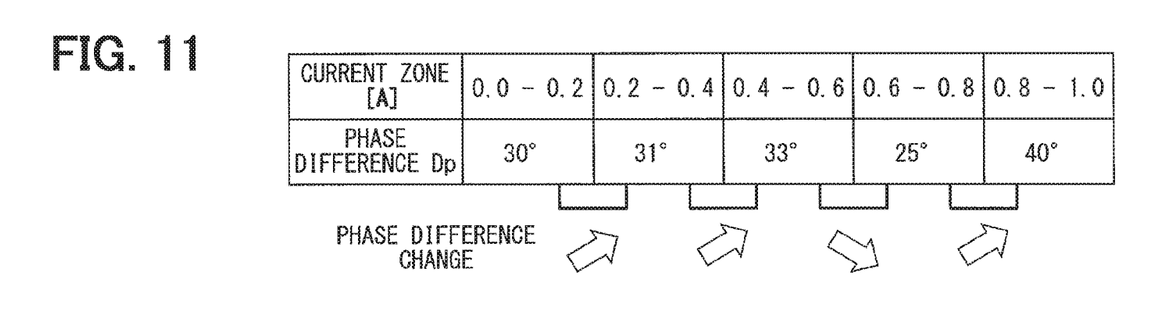
FIG. 11 is a chart showing one example of the detection of the self-excited vibration.

Further, as shown in FIG. 11, the self-excited vibration detection part 55 stores the phase difference Dp individually in each of predetermined multiple current zones of the target current values It. The target current value It is divided into the multiple current zones in consideration that the target current value It and the actual current value Im vary in correspondence to the dither period Td. As shown in FIG. 11, the target current value It, which varies from 0 [A] to 1 [A], may be divided into five current zones at every unit of 0.2 [A], for example. In case that the phase difference in the same current zone has already been stored, the self-excited vibration detection part 55 updates the stored phase difference with the newly calculated phase difference. Thus, even when the phase difference changes because of the self-excited vibration, it is possible to detect the self-excited vibration.

After step S10, the self-excited vibration detection part 55 checks whether the self-excited vibration is present based on a change in the target current value It, that is, a change in the current zone, and a change in the phase difference Dp resulting from the change in the target current value It at steps S20 and S30.

Because of an inductance characteristic of the solenoid 22, the actual current value Im (excitation current) rises rapidly and slowly in a small current zone and a large current zone. That is, the actual current value Im rises at lower speeds as the current value increases. For this reason, when the self-excited vibration is absent, the phase difference between the target current value It and the actual current value Im increases as the target current value It increases. The phase difference between the target current value It and the actual current value Im decreases as the current value of the target current value It decreases.

At step S20, the self-excited vibration detection part 55 checks whether the phase difference Dp has decreased relative to the increase in the target current value It. In the first embodiment, the self-excited vibration detection part 55 checks whether the phase difference Dp has decreased relative to the increase in the current zone. In case that the phase difference Dp has decreased relative to the increase in the current zone, the self-excited vibration detection part 55 determines that the self-excited vibration is present and executes self-excited vibration processing at step S40.

In case that the phase difference Dp has not decreased relative to the increase in the target current value It, the self-excited vibration detection part 55 determines that no self-excited vibration is present and executes step S30. At step S30, the self-excited vibration detection part 55 checks whether the phase difference Dp has increased relative to the decrease in the target current value It. In the first embodiment, the self-excited vibration detection part 55 checks whether the phase difference Dp has increased relative to the decrease in the current zone. In case that the phase difference Dp has increased relative to the decrease in the current zone, the self-excited vibration detection part 55 determines that the self-excited vibration is present and executes step S40. In case that the self-excited vibration detection part 55 determines at step S30 that the phase difference Dp has not increased relative to the decrease in the target current value It, the self-excited vibration detection part 55 finishes the series of processing described above.

FIG. 10 shows one exemplary case, in which the current zone of the target current value It changes to a one-level higher zone at time t1 and the self-excited vibration arises in response to the current change. Since a phase difference Dp2 calculated at around time t2 decreases relative to a phase difference Dp1, which is before the increase change in the target current value It, the self-excited vibration detection part 55 determines at time t2 that the self-excited vibration is present.

FIG. 11 shows an exemplary case, in which the self-excited vibration arises in the second highest current zone 0.6 to 0.8 [A] among five current zones. In FIG. 11, in which the target current value It increases from the left side, the phase difference Dp decreases relative to the increase in the current zone when the current changes increasingly from the current zone of 0.4 to 0.6 [A] to the one-level higher zone of 0.6 to 0.8 [A]. Thus it is determined that the self-excited vibration is present. Since the phase difference Dp increases relative to the decrease of the current zone in case of the decrease of the current zone from the zone of 0.6 to 0.8 [A] to the one-level lower zone of 0.4 to 0.6 [A], it is determined that the self-excited vibration is present.

Upon detection of the self-excited vibration based on the check processing at step S20 or step S30, the self-excited vibration detection part 55 executes the self-excited processing at step S40. In the first embodiment, the self-excited vibration detection part 55 outputs a signal, which indicates an occurrence of the self-excited vibration, to an external side. It is thus possible to notify a user of the occurrence of abnormality.

Advantages of the current control circuit 50 and the electronic control unit 30 according to the first embodiment will be described below.

According to the first embodiment, since the target current value It is varied periodically with the dither amplitude Ad and the dither period Td, the movable part of the solenoid 22 and the spool 24 is vibrated slightly. It is thus possible to suppress the degradation of responsiveness, which is caused by static friction and the variation of responsiveness.

The viscosity of the operation oil varies with the temperature Tf. In the first embodiment, since the dither amplitude Ad and the dither period Td are set in correspondence to the temperature Tf of the operation oil, high responsiveness is ensured even when the viscosity is varied.

In case of the configuration, which has the output oil feedback mechanism described above, the spool 24 is likely to self-excitedly vibrate because of resonance, which occurs when the time point of the output oil pressure feedback and the time point of driving of the solenoid 22 (spool 24) match. The self-excited vibration is likely to arise when the output oil pressure feedback and the small vibration of the spool 24 caused by the dither amplitude Ad and the dither period Td match.

According to the first embodiment, however, the self-excited vibration detection part 55 is provided to calculate the phase difference between the target current value It and the actual current value Im. Further, the self-excited vibration is detected based on the increase and decrease of the phase difference Dp corresponding to the change in the target current value It. Because of the inductance characteristic of the solenoid 22, the phase difference DP increases and decreases as the target current value It increases and decreases, respectively, when the self-excited vibration is not present. It is thus possible to detect that the self-excited vibration is present when the phase difference Dp decreases relative to the increase in the target current value It. It is also possible to detect that the self-excited vibration is present when the phase difference Dp increases relative to the decrease in the target current value It.

As described above, it is possible to detect the self-excited vibration of the linear solenoid valve 21 in simple configuration without newly adding a sensor for detecting the self-excited vibration.

Further, according to the first embodiment, the self-excited vibration detection part 55 calculates the phase difference Dp based on the difference between the time point of the maximum value of the target current value It and the time point of the maximum value of the actual current Im. Since the peak values of currents are used, it is possible to detect the phase difference accurately. It is also possible to attain the same advantage by calculating a time difference between a time point of a minimum value of the target current value It and a time point of a minimum value of the actual current value Im. Without being limited to the phase difference calculations described above, the phase difference may alternatively be calculated based on a difference between time points of intermediate values between the maximum and minimum values.

According to the first embodiment, the self-excited vibration detection part 55 checks whether the self-excited vibration is present based on the change in the current zone of the target current value It and the change in the phase difference. It is possible to more easily detect the increase and decrease in the current value of the target current value It, which periodically varies the dither amplitude Ad and the dither period Td. It is alternatively possible to check whether the target current value It is increased or decreased based on an average value of the target current value It of the dither period Td1 or the command current value Ib.

Particularly, according to the first embodiment, the self-excited vibration detection part 55 checks whether the self-excited vibration is present by comparing the phase differences Dp between two successive current zones. In comparison to a case, in which the phase differences Dp in two separated current zones like the current zone of 0.2 to 0.4 [A] and the current zone of 0.6 to 0.8 [A] are compared, it is possible to detect the self-excited vibration accurately because of the inductance characteristic of the solenoid 22.

Second Embodiment

A second embodiment will be described next. The second embodiment is similar to the first embodiment and hence the similar structure and operation will not be described for simplification of the description.

Figure 12:
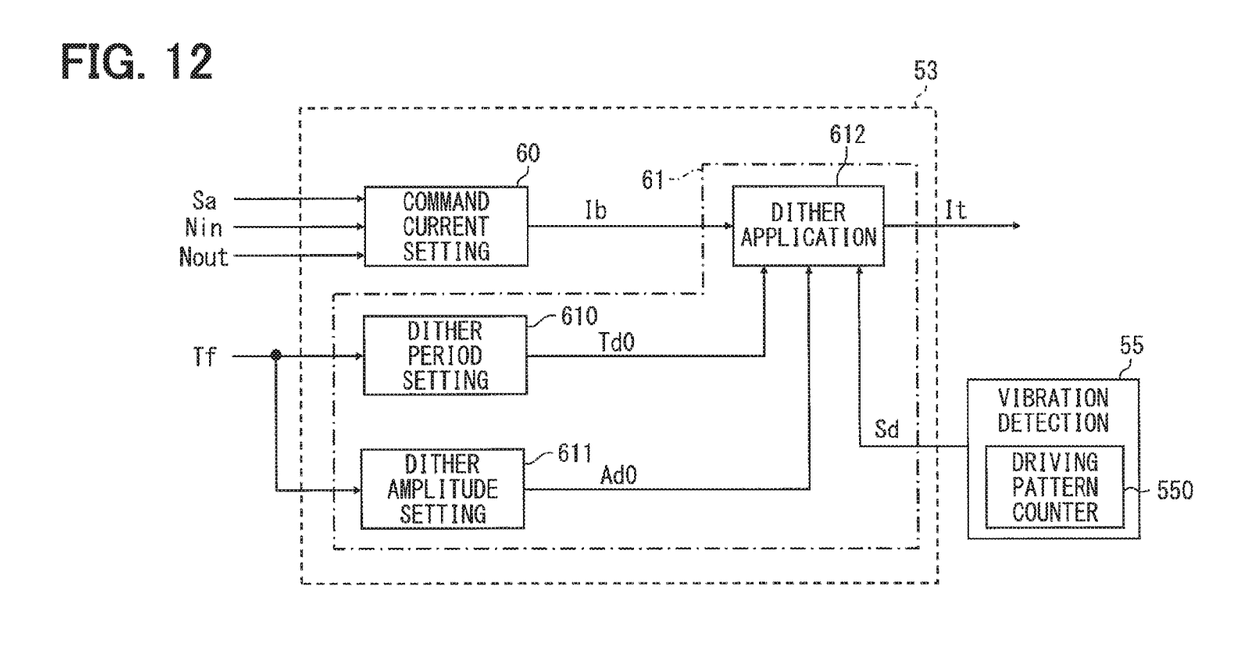
FIG. 12 is a block diagram showing a target setting part in a current control circuit according to a second embodiment.

As shown in FIG. 12, the self-excited vibration detection part 55 is configured to output a detection signal Sd indicating the detection result of the self-excited vibration to the target setting part 53. In the second embodiment, the self-excited vibration detection part 55 includes a driving pattern counter 550 and outputs a count value of the driving pattern counter 550 as the detection signal Sd. The self-excited vibration detection part 55 increments the count value of the driving pattern counter 550 upon detection of the self-excited vibration.

The dither application part 612 of the target setting part 53 sets the dither period Td and the dither amplitude Ad, which determine the driving pattern, in response to the detection signal Sd outputted from the self-excited vibration detection part 55. In case that the count value is 0, the dither application part 612 sets the dither period Td0 and the dither amplitude Ad0 corresponding to the temperature Tf as the dither period Td and the dither amplitude Ad, which determine the driving pattern.

In case that the count value is 1, the dither application part 612 changes at least one of the dither period Td and the dither amplitude Ad to be different from the dither period Td0 and the dither amplitude Ad0, which correspond to the temperature Tf. The dither application part 612 sets the driving pattern by changing at least one of the dither period Td and the dither amplitude Ad to be different at each change in the count value. The dither period Td and the dither amplitude Ad, which are changed over, are pre-stored in a memory.

Processing executed by the self-excited vibration detection part 55 will be described next with reference to FIG. 13 and FIG. 14. In the second embodiment, the count value of the driving pattern counter 550 is cleared before first execution of the following processing after the power supply is turned on. For example, the count value is cleared when the power supply is turned off.

Steps S10, S20 and S30 are executed in the same way as executed in the first embodiment. In case it is determined at steps S20 and S30 that no self-excited vibration is present, the count value of the driving pattern counter 550 is maintained without any change. In case that the count value of the driving pattern counter 550 is 1, the count value is maintained to be 1 as far as the self-excited vibration is not present.

When it is detected by the check processing at step S20 or step S30 that the self-excited vibration is present, the self-excited vibration detection part 55 executes self-excited vibration processing at step S42.

The self-excited vibration detection part 55 increments the count value of the driving pattern counter 550 by 1. Since the dither period Td and the dither amplitude Ad, which define the driving pattern, are changed in response to the change in the count value, the self-excited vibration detection part 55 clears the phase difference data of each current zone stored in the memory. The self-excited vibration detection part 55 then outputs the count value of the driving pattern counter 550 as the detection signal Sd at time of finishing the series of processing.

When the self-excited vibration detection part 55 detects the self-excited vibration again after detecting the self-excited vibration and incrementing the count value of the driving pattern counter 550, that is, after changing the driving pattern, the self-excited vibration detection part 55 increments the count value again. That is, during a period from detection of the self-excited vibration to detection of no vibration, the count value is incremented at each execution of step S42 and the driving pattern is changed correspondingly.

Figure 14:
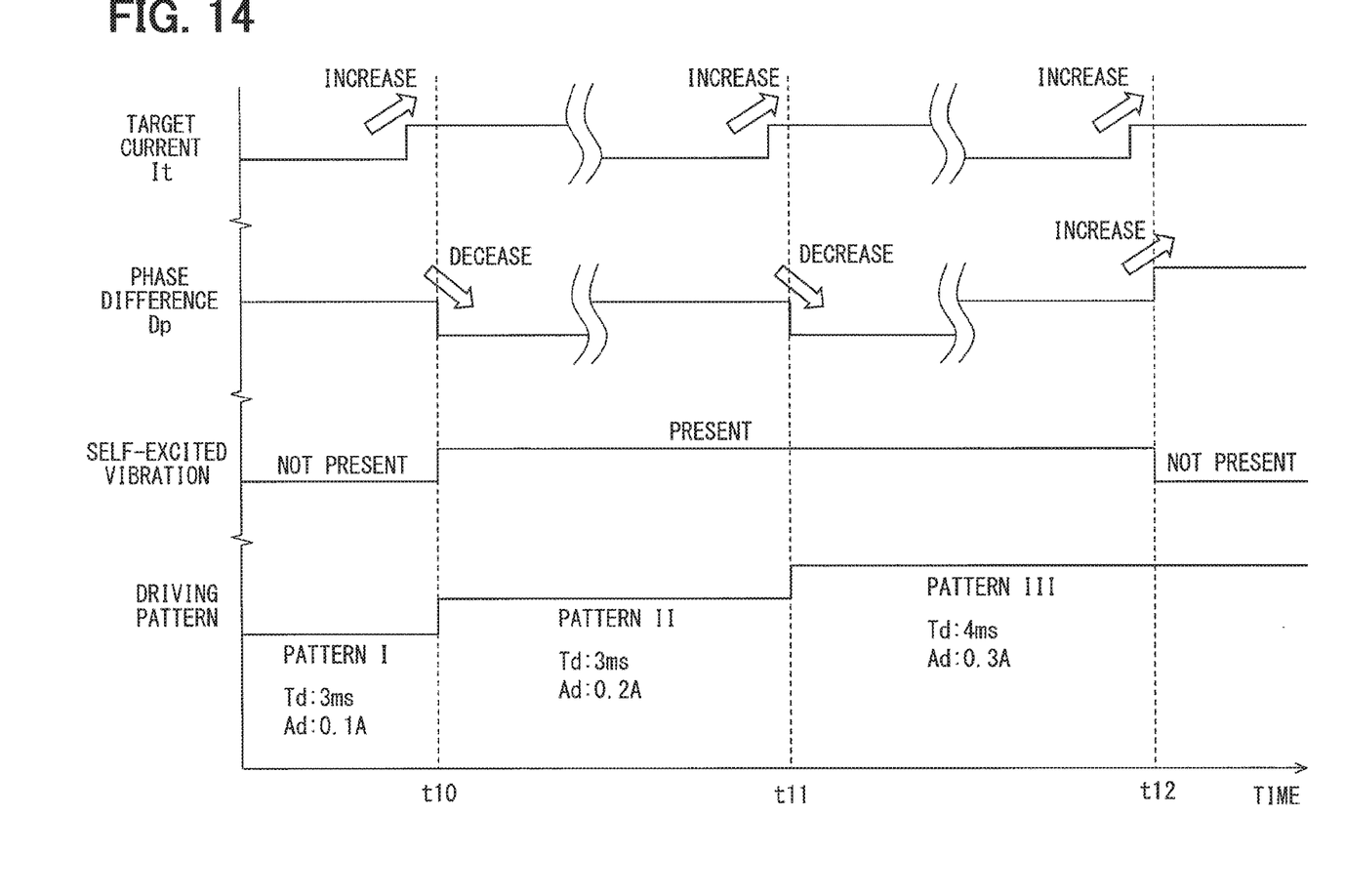
FIG. 14 is a time chart showing one example of the self-excited vibration detection and a driving pattern change.

FIG. 14 shows one example of changing the driving pattern multiple times in response to the detection of the self-excited vibration. In FIG. 14, the temperature Tf is assumed to be constant. As shown in FIG. 14, the self-excited vibration detection part 55 checks whether the self-excited vibration is present at time t10, t11 and t12.

The count value of the driving pattern counter 550 in the self-excited vibration detection part 55 is 0 until time t10. The dither application part 612 thus sets a first driving pattern I as the driving pattern. The driving pattern I is set in correspondence to the temperature Tf. The dither period Td and the dither amplitude Ad of the driving pattern I are 3 [ms] and 0.1 [A], respectively.

As the target current value It increases, that is, the current zone increases, the self-excited vibration detection part 55 checks whether the self-excited vibration is present at time t10. The phase difference Dp decreases at time t10 and the self-excited vibration is detected. In response to the detection of the self-excited vibration, the count value of the driving pattern counter 550 in incremented to 1 and the dither application part 612 sets a second driving pattern II as the driving pattern. The driving pattern II is different from the first driving pattern I in respect of only the dither amplitude Ad. The dither period Td and the dither amplitude Ad of the driving pattern II are 3 [ms] and 0.2 [A], respectively.

In FIG. 14, the self-excited vibration detection part 55 checks whether the self-excited vibration continues even after the driving pattern change to the driving pattern II. With an increase in the target current value It, the self-excited vibration detection part 55 checks the self-excited vibration again at time t11. In case that the phase difference Dp is decreased at time t11, the self-excited vibration is detected. In response to the detection of the self-excited vibration, the count value of the driving pattern counter 550 is incremented to 2 and the dither application part 612 sets a third driving pattern III as the driving pattern. The driving pattern III is different from the driving pattern II in respect of both of the dither period Td and the dither amplitude Ad. The dither period Td and the dither amplitude Ad of the driving pattern III are 4 [ms] and 0.3 [A], respectively.

In FIG. 14, it is assumed that the self-excited vibration detection part 55 checks whether the self-excited vibration continues to be present even after the drivng pattern change to the driving pattern III. With an increase in the target current value It, the self-excited vibration detection part 55 checks whether the self-excited vibration is present again at time t12. At time t12, it is detected that the phase difference Dp is increased and the self-excited vibration is not present any more. As a result, the count value of the driving pattern counter 550 is maintained at 2 and the dither application part 612 maintains the driving pattern III as the driving pattern.

Advantages of the current control circuit 50 and the electronic control unit 30 according to the second embodiment will be described below.

According to the second embodiment, when the self-excited vibration detection part 55 detects an abnormality in the phase difference Dp relative to the increase and decrease in the target current value It, the self-excited vibration detection part 55 increments the count value of the driving pattern counter 550 and outputs the count value as the detection signal Sd. The dither application part 612 of the target setting part 53 sets the dither period Td and the dither amplitude Ad, which define the driving pattern, based on the detection signal Sd outputted from the self-excited vibration detection part 55. Thus, when the self-excited vibration is detected, the dither application part 612 sets the driving pattern by changing a value of at least one of the dither period Td0 and the dither amplitude Ad0, which correspond to the temperature Tf, as the driving pattern. It is therefore possible to suppress the self-excited vibration from continuing.

Particularly, according to the second embodiment, the driving pattern is continued to be changed over until the self-excited vibration disappears. The self-excited vibration detection part 55 increments the count value at every execution of step S42 during the period from the detection of the self-excited vibration to no detection of the self-excited vibration. The dither application part 612 sets the driving pattern by changing at least one of the dither period Td and the dither amplitude Ad at every change in the count value. It is thus possible to restore a state of no self-excited vibration even when the self-excited vibration arises.

In the second embodiment, it is exemplified that the phase difference Dp is calculated at every period of the dither period Td1. Alternatively, the number of calculations of the phase difference Dp may be decreased to lower the processing load of the CPU of the current control circuit 50. For example, once the self-excited vibration is detected, the processing, which follows the calculation of the phase difference Dp, may be skipped until the target current value It (current zone) is increased or decreased.

Figure 13:
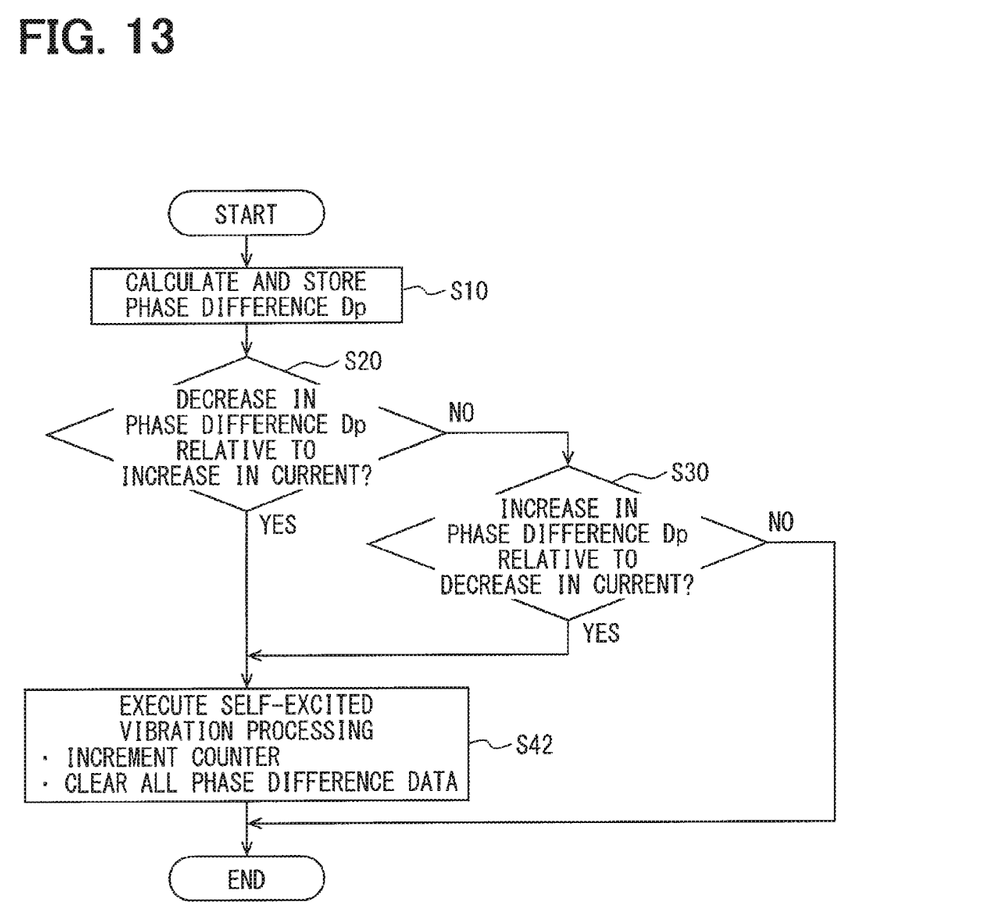
FIG. 13 is a flowchart showing processing executed by the self-excited vibration detection part.
Figure 15:
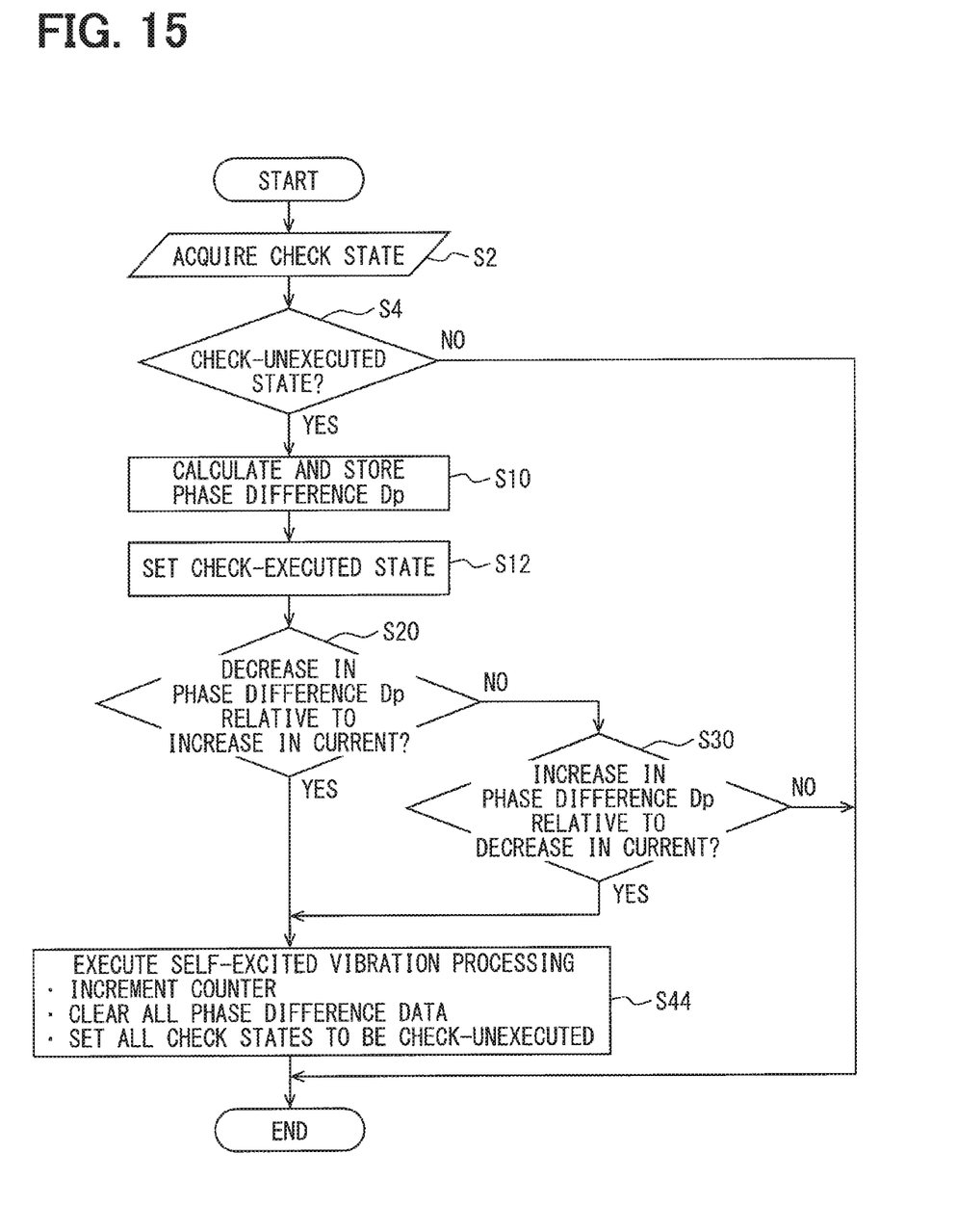
FIG. 15 is a flowchart showing a first modification example of processing executed by the self-excited vibration detection part.

In a first modification example shown in FIG. 15, steps S2, S4 and S12 are executed additionally to the processing of the self-excited vibration detection part 55 shown in FIG. 13. Processing at step S44, which is executed when the self-excited vibration is detected, is partly different from the processing of step S42 shown in FIG. 13.

As shown in FIG. 15, the self-excited vibration detection part 55 acquires a check state at step S2. The check state includes setting of check execution zones, each of which is between two neighboring current zones, in which the self-excited vibration is detectable, and storing of check execution information for each check execution zone. The check state is defined in a table form. Specifically, four check execution zones are set at four inter-zones among five current zones shown in FIG. 11. In case that at least one of step S20 and step S30 has been executed for each of the check execution zones, a check-executed state is set. In case that none of step S20 and step S30 have been executed for each of the check execution zones, a check-unexecuted state is set.

The self-excited vibration detection part 55 then acquires the target current value It and checks whether the check-unexecuted state is set for the check execution zone at step S4, which corresponds to the check-executed zone corresponding to the acquired target current value It. In case that the check-unexecuted state is not set, that is, the checking has been executed, the series of processing is finished.

In case that the check-unexecuted state is set, the self-excited vibration detection part 55 executes the processing of step S10 and sets the check-executed state for the corresponding check execution zone at step S12. The self-excited vibration detection part 55 then executes steps S20 and S30.

Upon detection of the self-excited vibration in the check processing of step S20 or step S30, the self-excited vibration detection part 55 executes the self-excited vibration processing at step S44. The self-excited vibration detection part 55 then increments the count value of the driving pattern counter 550. With the incremental change of the count value, the dither period Td and the dither amplitude Ad of the driving pattern are changed. As a result, the phase difference data of each current zone stored in the memory is cleared. Further, the check execution information of all the check execution zones is set to the check-unexecuted states. Thus the self-excited vibration detection part 55 finishes the series of processing. The self-excited vibration detection part 55 outputs the count value of the driving pattern counter 550 as the detection signal Sd at time of finishing the series of processing.

According to the first modification example, the self-excited vibration detection part 55 skips step S10 and subsequent steps with respect to the check-executed zones. Thus it is possible to decrease the processing load of the CPU.

According to the second embodiment, the driving pattern setting part 61 includes the dither period setting part 610, the dither amplitude setting part 611 and the dither application part 612 and the detection signal Sd of the self-excited vibration detection part 55 is inputted to the dither application part 612 to set the driving pattern. However, this configuration may be modified.

Figure 16:
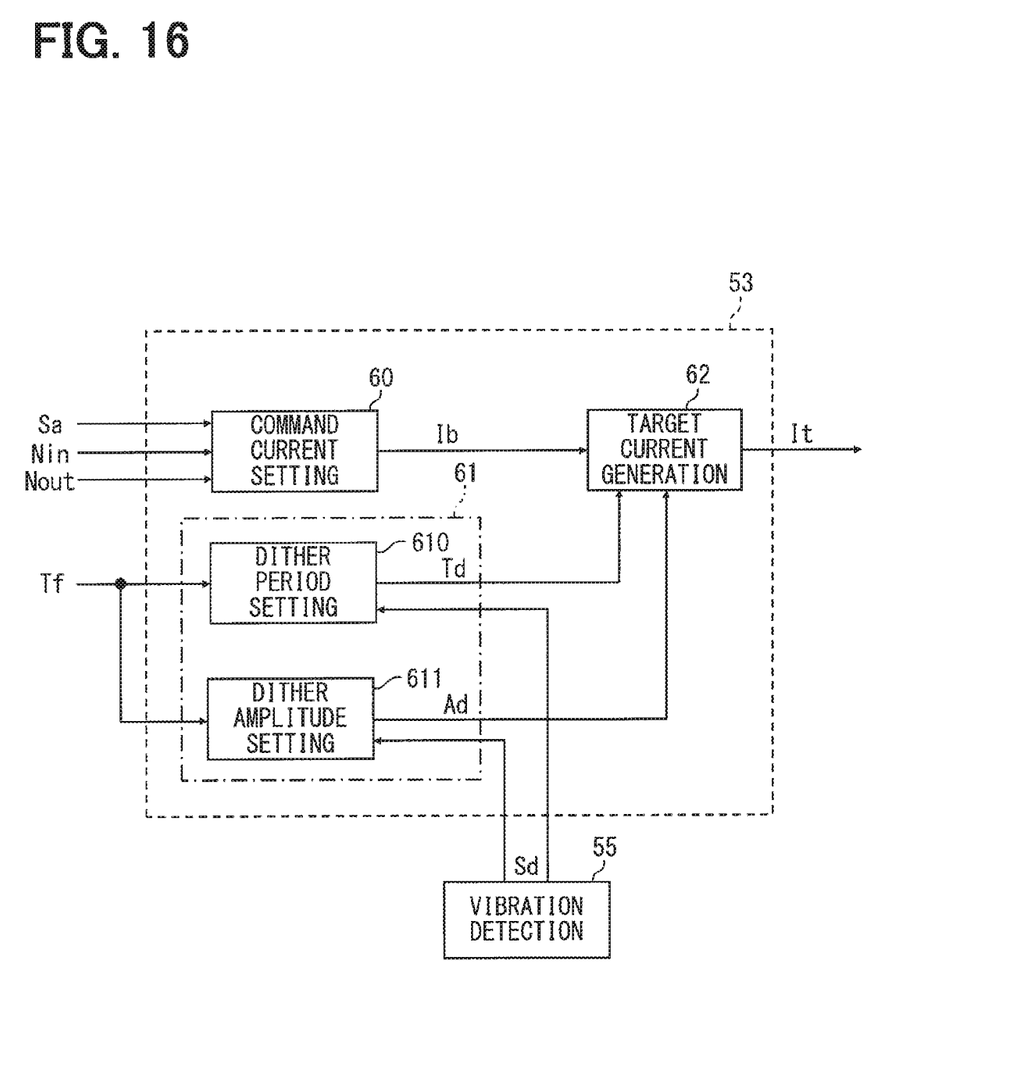
FIG. 16 is a block diagram showing a second modification example of the target setting part.

For example, as a second modification example shown in FIG. 16, the target setting part 53 includes a target current generation part 62 in addition to the command setting part 60 and the driving pattern setting part 61. The driving pattern setting part 61 includes the dither period setting part 610 and the dither amplitude setting part 611.

The detection signal Sd of the self-excited vibration detection part 55 is applied to both of the dither period setting part 610 and the dither amplitude setting part 611. The dither period setting part 610 and the dither amplitude setting part 611 set the dither period Td and the dither amplitude Ad of the driving pattern, respectively, based on the temperature Tf and the count value of the driving pattern counter 550 and output the set period and amplitude to the target current generation part 62. The target current generation part 62 is configured to set a dither current value, which periodically changes with the dither period Td and the dither amplitude Ad and generates the target current value It by adding the dither current value to the command current value Ib.

The current control circuit 50 and the electronic control unit 30 are not limited to the embodiments and modification examples described above and may be modified further as described below.

For example, the current control circuit 50 may be applied to an electromagnetic valve, which is provided for other than the oil pressure circuit 20 of the automatic transmission 10. The electromagnetic valve may be other than the linear solenoid valve 21. The current control circuit 50 may be applied to an electromagnetic valve, which is provided in an oil pressure circuit to feed back the output oil pressure.

What is claimed is:

1. A current control circuit for an electromagnetic valve provided in an oil pressure circuit to feed back an output oil pressure, the current control circuit comprising:
    a PWM signal generation part configured to generate a PWM signal outputted to a driving circuit of the electromagnetic valve;
    a target setting part configured to set a target current value, which is a target value of an excitation current of the electromagnetic valve and periodically varies with a predetermined dither amplitude and a dither period longer than a pulse period of the PWM signal;
    a duty ratio setting part configured to set a duty ratio of the PWM signal so that an actual current of the excitation current of the electromagnetic valve follows the target current value; and
    a vibration detection part configured to calculate a phase difference between the target current value and the actual current value and detecting a presence of self-excited vibration in the electromagnetic valve because of a resonance of a feedback of the output oil pressure and driving of the electromagnetic valve in the dither period when the phase difference decreases relative to an increase in the target current value or the phase difference increases relative to a decrease in the dither period.

2. The current control circuit according to claim 1, wherein:
    the target setting part includes a command setting part configured to set a command current value, which corresponds to a target operation state of the electromagnetic valve, and a driving pattern setting part configured to set the dither period and the dither amplitude as a driving pattern for vibrating a movable part of the electromagnetic valve; and
    the target current value is generated by applying the dither period and the dither amplitude to the command current value.

3. The current control circuit according to claim 2, wherein:
    the driving pattern setting part sets the dither period and the predetermined dither amplitude based on an oil temperature of the oil pressure circuit.

4. The current control circuit according to claim 3, wherein:
    the driving pattern setting part sets as the driving pattern a pattern by changing at least a value of one of the dither period and the dither amplitude of the driving pattern, which are set based on the oil temperature.

5. The current control circuit according to claim 4, wherein:
    the driving pattern setting part continues to change the driving pattern until the self-excited vibration is stopped.

6. The current control circuit according to claim 1, wherein:
    the vibration detection part calculates the phase difference based on a time difference between time points of maximum values of the target current value and the actual current value or a time difference between time points of minimum values of the target current value and the actual current value.

7. The current control circuit according to claim 1, wherein:
    multiple current zones are set for the target current value varying with the dither amplitude and the dither period; and
    the vibration detection part checks whether the phase difference increases or decreases relative to the target current value by comparing phase differences of different current zones.

8. The current control circuit according to claim 7, wherein:
    the vibration detection part checks whether the phase difference increases or decreases by comparing the phase differences between neighboring current zones.

9. The current control circuit according to claim 1, wherein:
    the electromagnetic valve is a spool type, in which the output oil pressure is fed back to a spool of the electromagnetic valve.

10. The current control circuit according to claim 1, wherein:
    the oil pressure circuit is provided in a transmission of a vehicle.

11. A current control circuit for an electromagnetic valve provided in an oil pressure circuit to feed back an output oil pressure, the current control circuit comprising:
    a microcomputer configured to:
        generate a PWM signal outputted to a driving circuit of the electromagnetic valve;
        set a target current value, which is a target value of an excitation current of the electromagnetic valve and periodically varies with a predetermined dither amplitude and a dither period longer than a pulse period of the PWM signal;
        set a duty ratio of the PWM signal so that an actual current of the excitation current of the electromagnetic valve follows the target current value; and
        calculate a phase difference between the target current value and the actual current value and detect a presence of self-excited vibration in the electromagnetic valve because of a resonance of a feedback of the output oil pressure and driving of the electromagnetic valve in the dither period when the phase difference decreases relative to an increase in the target current value or the phase difference increases relative to a decrease in the dither period.

12. The current control circuit according to claim 11, wherein:
the microcomputer is further configured to
set a command current value, which corresponds to a target operation state of the electromagnetic valve, and
set the dither period and the dither amplitude as a driving pattern for vibrating a movable part of the electromagnetic valve; and
the target current value is generated by applying the dither period and the dither amplitude to the command current value.

13. The current control circuit according to claim 12, wherein:
the microcomputer is further configured to set the dither period and the predetermined dither amplitude based on an oil temperature of the oil pressure circuit.

14. The current control circuit according to claim 13, wherein:
the microcomputer is further configured to set as the driving pattern a pattern by changing at least a value of one of the dither period and the dither amplitude of the driving pattern, which are set based on the oil temperature.

15. The current control circuit according to claim 14, wherein:
the microcomputer is further configured to continue to change the driving pattern until the self-excited vibration is stopped.

16. The current control circuit according to claim 11, wherein:
the microcomputer is further configured to calculate the phase difference based on a time difference between time points of maximum values of the target current value and the actual current value or a time difference between time points of minimum values of the target current value and the actual current value.

17. The current control circuit according to claim 11, wherein:
multiple current zones are set for the target current value varying with the dither amplitude and the dither period; and
the microcomputer is further configured to check whether the phase difference increases or decreases relative to the target current value by comparing phase differences of different current zones.

18. The current control circuit according to claim 17, wherein:
the microcomputer is further configured to check whether the phase difference increases or decreases by comparing the phase differences between neighboring current zones.

19. The current control circuit according to claim 11, wherein:
the electromagnetic valve is a spool type, in which the output oil pressure is fed back to a spool of the electromagnetic valve.

20. The current control circuit according to claim 11, wherein:
the oil pressure circuit is provided in a transmission of a vehicle.

* * * * *